United States Patent
Kim et al.

(10) Patent No.: US 10,681,580 B2
(45) Date of Patent: Jun. 9, 2020

(54) METHOD AND APPARATUS FOR MEASURING RSRP IN MOBILE COMMUNICATION SYSTEM

(71) Applicant: Samsung Electronics Co., Ltd., Suwon-si, Gyeonggi-do (KR)

(72) Inventors: Jaewon Kim, Seoul (KR); Seunghoon Park, Suwon-si (KR); Jeongho Park, Seoul (KR); Peng Xue, Suwon-si (KR); Hyunkyu Yu, Suwon-si (KR); Namjeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/031,540

(22) Filed: Jul. 10, 2018

(65) Prior Publication Data

US 2019/0014493 A1 Jan. 10, 2019

(30) Foreign Application Priority Data

Jul. 10, 2017 (KR) .................. 10-2017-0087091

(51) Int. Cl.

| H04W 24/10 | (2009.01) |
|---|---|
| H04W 56/00 | (2009.01) |
| H04W 76/27 | (2018.01) |
| H04B 17/318 | (2015.01) |
| H04B 17/24 | (2015.01) |
| H04L 5/00 | (2006.01) |

(52) U.S. Cl.
CPC ............ *H04W 24/10* (2013.01); *H04B 17/24* (2015.01); *H04B 17/318* (2015.01); *H04L 5/0053* (2013.01); *H04W 56/0015* (2013.01); *H04W 76/27* (2018.02); *H04L 5/001* (2013.01); *H04L 5/0007* (2013.01); *H04L 5/0048* (2013.01)

(58) Field of Classification Search
None
See application file for complete search history.

(56) References Cited

U.S. PATENT DOCUMENTS

| 2016/0174179 | A1* | 6/2016 | Seo .................. H04W 56/0015 |
|---|---|---|---|
| | | | 370/350 |
| 2016/0330641 | A1* | 11/2016 | Zhang .................. H04W 24/02 |
| 2016/0374038 | A1* | 12/2016 | Wang .................. H04L 5/0014 |
| 2018/0242324 | A1* | 8/2018 | Luo .......................... H04L 5/005 |
| 2018/0288755 | A1* | 10/2018 | Liu ........................ H04L 5/005 |
| 2018/0302889 | A1* | 10/2018 | Guo ...................... H04L 5/0085 |
| 2018/0359716 | A1* | 12/2018 | Bai ...................... H04W 56/001 |
| 2019/0116530 | A1* | 4/2019 | Da Silva ........... H04W 36/0094 |
| 2019/0363809 | A1* | 11/2019 | Yoon .................... H04B 17/318 |
| 2020/0059398 | A1* | 2/2020 | Pan ..................... H04W 56/001 |

* cited by examiner

*Primary Examiner* — Xavier S Wong
(74) *Attorney, Agent, or Firm* — Jefferson IP Law, LLP

(57) ABSTRACT

A communication scheme and system for converging a 5$^{th}$ generation (5G) communication system for supporting a data rate higher than that of a 4$^{th}$ generation (4G) system with an internet of things (IoT) technology, and a method and apparatus therefor are provided. The applicable to intelligent services (e.g., smart home, smart building, smart city, smart car, connected car, health care, digital education, retail, and security and safety-related services) based on the 5G communication technology and the IoT-related technology.

16 Claims, 11 Drawing Sheets

METHOD AND APPARATUS FOR MEASURING RSRP IN MOBILE COMMUNICATION SYSTEM

CROSS-REFERENCE TO RELATED APPLICATION(S)

This application is based on and claims priority under 35 U.S.C. § 119 of a Korean patent application number 10-2017-0087091, filed on Jul. 10, 2017, in the Korean Intellectual Property Office, the disclosure of which is incorporated by reference herein in its entirety.

BACKGROUND

1. Field

The disclosure relates to operations of a base station and a terminal for measuring an L1-RSRP and L3-RSRP of serving cells and neighboring cells.

2. Description of Related Art

In order to meet the increasing demand for wireless data traffic since the commercialization of 4th generation (4G) communication systems, the development focus is on the 5th generation (5G) or pre-5G communication system. For this reason, the 5G or pre-5G communication system is called a beyond 4G network communication system or post long-term evolution (LTE) system. Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying (FSK) and quadrature amplitude modulation (QAM) (FQAM) and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies. In the 5G communication system, there may be terminals that transmit and receive signals in various bandwidths, each of the terminals may receive multiple synchronization signal blocks in the frequency domain. This imposes a problem in that the terminal has to determine a synchronization signal block to use.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide operations of a base station and a terminal in association with a method for measuring L1-RSRP and/or L3-RSRP of a serving cell and neighboring cells. Also, the disclosure aims to provide a method for negotiation between a base station and a terminal and operation of the terminal particularly when multiple synchronization signal blocks are transmitted in the frequency domain.

Additional aspects will be set forth in part in the description which follows and, in part, will be apparent from the description, or may be learned by practice of the presented embodiments.

In accordance with an aspect of the disclosure, a method of a base station of a communication system is provided. The method includes transmitting measurement configuration information to a terminal and receiving measurement result information of synchronization signal blocks based on the measurement configuration information from the terminal, wherein the measurement configuration information includes resource information of the synchronization signal blocks on which the terminal performs measurement including information on a number of measurement results. In accordance with another aspect of the disclosure, a method of a terminal of a communication system is provided. The method includes receiving measurement configuration information from a base station, measuring at least one synchronization signal block based on the measurement configuration information, and transmitting measurement result information generated based on the synchronization signal measurement result to the base station, wherein the measurement configuration information includes resource information of the synchronization signal blocks on which the terminal performs measurement including information on a number of measurement results.

In accordance with another aspect of the disclosure, a base station of a communication system is provided. The base station includes a transceiver and at least one processor configured to control the transceiver to transmit measurement configuration information to a terminal and receive measurement result information of synchronization signal blocks based on the measurement configuration information from the terminal, wherein the measurement configuration information includes resource information of synchronization signal blocks on which the terminal performs measurement including information on a number of measurement results.

In accordance with another aspect of the disclosure, a terminal of a communication system is provided. The terminal includes a transceiver and at least one processor configured to control the transceiver to receive measurement configuration information from a base station and transmit measurement result information generated based on a synchronization signal measurement result to the base station and control to measure at least one synchronization signal block based on the measurement configuration information, wherein the measurement configuration information includes resource information of the synchronization signal blocks on which the terminal performs measurement including information on a number of measurement results.

Preferably, the measurement result information is, if the terminal is configured in a first measurement mode, a value obtained by averaging measurement results of at least one synchronization signal block being transmitted at the same time and, if the terminal is configured in a second measurement mode, a measurement result of the synchronization signal blocks distinguished by time and frequency resources. Preferably, the terminal receives measurement mode configuration-related information from the base station, and the measurement mode configuration-related information is information indicating a first measurement mode or a second measurement mode or information indicating whether a quasi-colocation (QCL) assumption is applied to at least one synchronization signal block being transmitted at the same time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
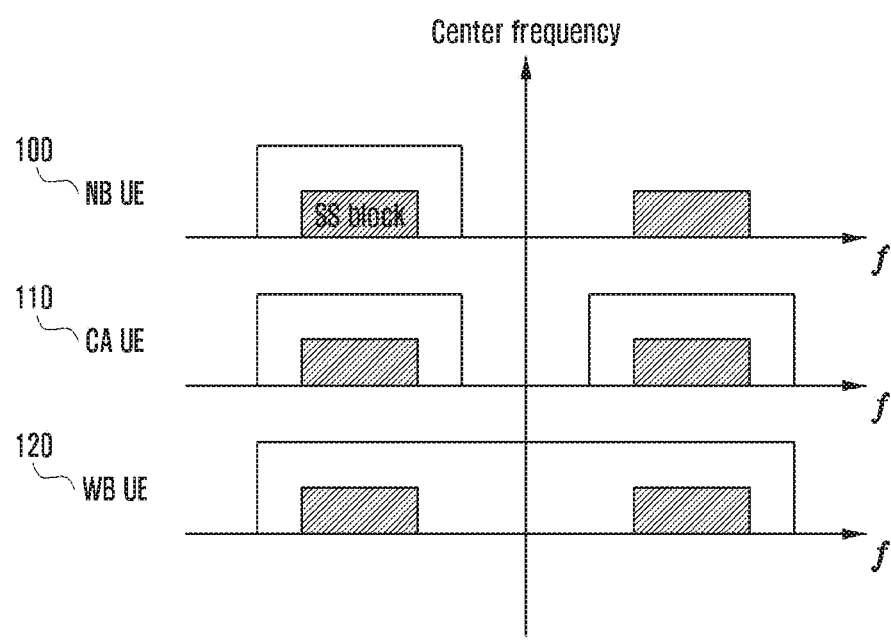
FIG. 1 is a diagram illustrating user equipment (UE) class-specific component carriers (CCs) and SS-blocks according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed description of embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

A new RAT (hereinafter, interchangeably referred to as new radio access network, new radio access technology, and NR) system allows for communication between a terminal (hereinafter, interchangeably referred to as a user equipment (UE) and a mobile station (MS)) and a base station (hereinafter, interchangeably referred to as a BS and a gNode B). In particular, it is assumed that terminals with various bandwidth capabilities coexist in the NR system. In detail, some terminals are capable of transmitting and receiving signals in the bandwidth of 100 MHz while others are capable of transmitting and receiving signals in the bandwidth of 1 GHz. In NR, the transmission/reception capability of a terminal is defined with component carrier's bandwidths, i.e., wideband (WB) component carrier (CC) and narrowband (NB) CC. A wideband CC may consist of narrow band CCs and carry multiple synchronization signal blocks or synchronization sequence blocks (hereinafter, interchangeably referred to as SS-blocks). The method and apparatus proposed in the disclosure may be identically embodied with bandwidth (BW) parts configured by a base station instead of the CCs.

FIG. 1 is a diagram illustrating UE class-specific CCs and SS-blocks according to an embodiment of the disclosure.

In view of UEs, the SS-blocks carried by one CC may be different in number depending on the UE. In the example of FIG. 1, one SS-block is transmitted to the NB UE 100 or CA UE 110 per CC, while two SS-blocks are simultaneously transmitted to the WB UE 120 per CC in the frequency domain.

Figure 2:
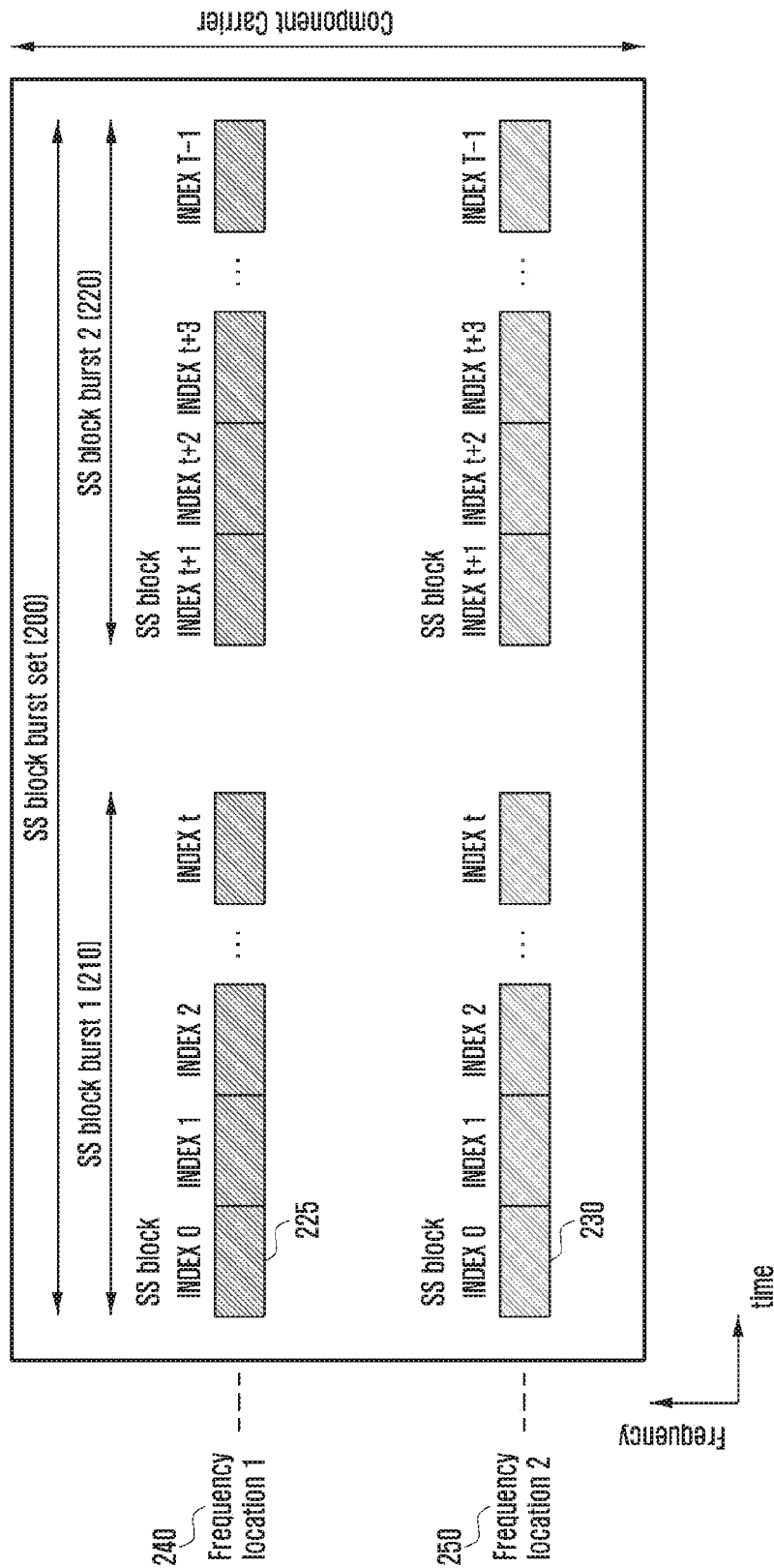
FIG. 2 is a diagram illustrating a case where multiple SS-blocks are transmitted on one CC according to an embodiment of the disclosure.

FIG. 2 is a diagram illustrating a case where multiple SS-blocks are transmitted on one CC according to an embodiment of the disclosure.

FIG. 2 depicts a case where two SS-blocks are transmitted on one CC in the frequency domain. It is defined that one SS-block burst 210 or 220 consists of a plurality of SS-blocks and one SS-block burst set 200 consists of a plurality of SS-block bursts 210 and 220. In the following description, it is assumed that one SS-block burst set consists of T SS-blocks. It is defined that a primary synchronization signal (PSS), a secondary synchronization signal (SSS), and a physical broadcast channel (PBCH) are time-division-multiplexed (TDMed) into one SS-block 225 or 230. The SS-blocks being simultaneously transmitted in time at different frequencies may have the same SS-block index. For example, the first SS-block 225 being transmitted at first frequency location 1 240 and the first SS-block 230 being transmitted at second frequency location 2 250 may have the same index of 0. The base station may notify the UE of a transmission interval of the SS-block burst set. If the transmission interval is not preconfigured, the terminal assumes that the base station transmits the SS-block burst set at a default transmission interval.

A description is made of the quasi-co-location assumption between SS-blocks in the frequency domain.

If SS-blocks have the same quasi-colocation (QCL) assumption, this means that the UE may assume that the SS-blocks have been transmitted by the transmitter with the same characteristics for one or more QCL parameters. Here, the QCL parameters may include Doppler spread, Doppler shift, average delay parameters, and spatial Rx parameters. Here, the spatial Rx parameters may include at least one of angle of arrival (AoA), dominant AoA, average AoA, power angular spectrum (PAS) of AoA, average angle of departure (AoD), PAS of AoD, transmit/receive channel correlation, transmit/receive beamforming, and spatial channel correlation. Such QCL characteristics may be understood as a combination of the QCL characteristics of the legacy long-term evolution (LTE) and beam domain-related QCL characteristics. In the embodiments of the disclosure, QCL is mainly applied only to the spatial Rx parameters.

According to an embodiment of the disclosure, it may be assumed that a UE may always assume the same QCL among all SS-blocks with the same SS-block index in the frequency domain. This assumption may be applied to the serving and neighboring cells.

According to another embodiment of the disclosure, a base station may configure to the UE whether the UE assumes the same QCL among all SS-blocks with the same SS-block index in the frequency domain using an RRC message as shown in Table 1. If an indicator indicating whether the same QCL is assumed among the SS-blocks in the frequency domain is set to ON, the UE may assume the same QCL among all SS-blocks with the same SS-block index in the frequency domain. This assumption may be identically applied to the serving and neighboring cells.

TABLE 1

Same QCL assumption among SS-blocks in frequency domain ON/OFF

According to another embodiment of the disclosure, the base station may transmit to the UE the information on the QCL assumption between the SS-blocks with the same SS-block index in the time domain through an RRC message. This information may be transmitted to the UE for only the serving cell. The base station may transmit the QCL assumption information to the UE via a QCL index. For example, the base station may configure the QCL index per SS-block index for the SS-block being transmitted at one frequency location and notify the UE of the QCL index. The base station may also configure the QCL index per SS-block index for the SS-block being transmitted at another frequency location and notify the UE of the QCL index. If the same QCL index is assigned to the SS-blocks with different SS-block indices in the frequency domain, the UE may apply the same QCL assumption among the SS-blocks. Here, the terminal may assume that the SS-block corresponding to a reference frequency location agreed between the base station and the UE has the SS-block index and QCL index that are identical to each other. For example, the QCL index information configured as shown in Table 2 may be transmitted to the UE. Table 2 is just an example.

TABLE 2

| SS-block index | 0 | 1 | 2 | 3 | 4 | 5 | 6 | 7 |
|---|---|---|---|---|---|---|---|---|
| QCL index for SS-blocks at frequency location 1 | 0 | 1 | 2 | 3 | 4 | 5 | 6 | 7 |
| QCL index for SS-blocks at frequency location 2 | 4 | 5 | 6 | 7 | 0 | 1 | 2 | 3 |

A description is made of the L1//L3-RSRP measurement method hereinafter.

According to an embodiment of the disclosure, it may be possible that different numbers of frequency domain SS-blocks are transmitted through different cells. For example, it may be possible that N SS-blocks are transmitted through one cell while M SS-blocks are transmitted through another cell in the frequency domain. Hereinafter, the description is made under the assumption of the situation where N>M and the number of frequency domain SS-blocks being transmitted through the serving cell is N.

In the disclosure, it is considered that the terminal performs reference signal received power (RSRP) measurement on multiple frequency domain SS-blocks being simultaneously transmitted by a base station over one CC. The number of frequency domain SS-blocks on which the RSRP measurement may be determined per UE depends on the implementation. In the disclosure, the number of RSRP values which the terminal can generated by measuring SS-blocks is referred to as $M_{max}$. This value of $M_{max}$ may be carried in the UE capability information being transmitted to the base station.

In the disclosure, L1-RSRP is obtained by performing measurement on the physical layer and layer 1 (L1 filtering) on the measurement result, and L3-RSRP is obtained by performing layer 3 (L3 filtering) on the measurement result from the physical layer. For more details on the L3-RSRP, see the 3rd generation partnership project technical specification (3GPP TS) 36.331.

Figure 3:
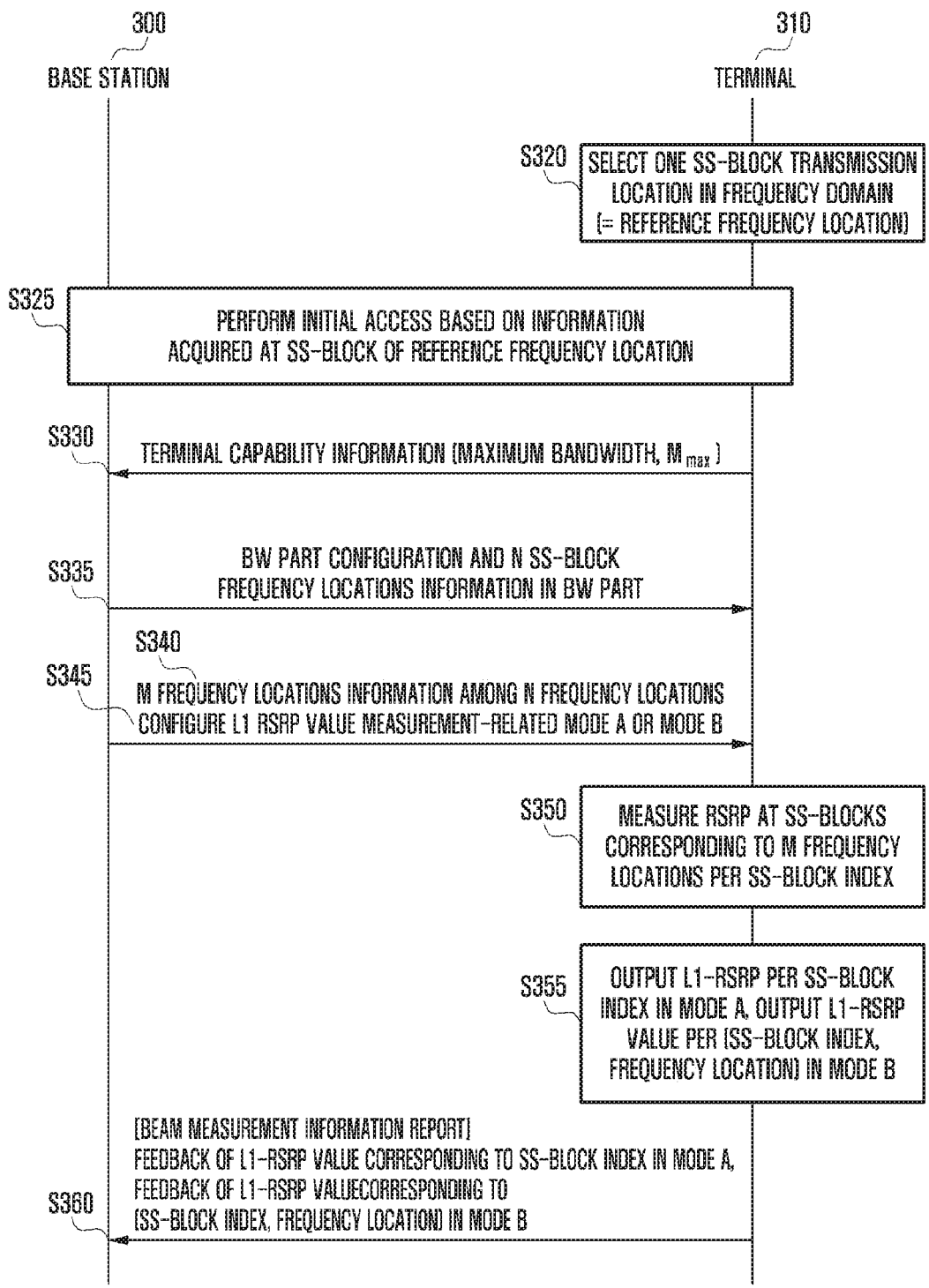
FIG. 3 is a signal flow diagram illustrating signal flows between a base station and a terminal according to an embodiment of the disclosure.

FIG. 3 is a signal flow diagram illustrating signal flows between a base station and a terminal according to an embodiment of the disclosure.

Referring to FIG. 3, the terminal 310 may select one of a plurality of frequency locations at which frequency domain SS-blocks are transmitted to select a cell for use in initial access. The terminal may configure the selected frequency location as the reference frequency location at operation S320.

The terminal performs L1-RSRP and L3-RSRP measurement on the SS-block corresponding to the reference frequency location in the initial access and selects a cell for use in attempting the initial access based on the L3-RSRP measurement result. The terminal may perform the initial access with the base station 300 based on the information acquired from the SS-block at the reference frequency location. In the initial access procedure of operation S325, the terminal transmits a random-access channel (RACH) and receives a random-access response in reply to the RACH based on the cell-specific information (e.g., master information block (MIB) and/or remaining system information (RMSI)) corresponding to the SS-block at the reference frequency location.

In the initial access, the terminal may perform L1 and L3 RSRP measurements as follows. The terminal applies the use of the above method as default. Next, a description is made of the L1 and L3 RSRP measurements of the UE at the SS-block index t according to the default settings. According to the default settings, the terminal calculates the L1-RSRP with the RSRP value measured only at the SS-block corresponding to the reference frequency location using Equation 2. According to the default settings, the terminal may also calculate the L3-RSRP with the RSRP value measured only at the SS-block corresponding to the reference frequency location. The following operations may be performed independently per SS-block index, and the terminal may generate the L1-RSRP value per SS-block index.

According to the default settings, the terminal may output the L1-RSRP value $P_n$ using the RSRP value $X_n$ measured at the SS-block corresponding to the reference frequency location as follows.

$$P_n = (1-a)P_{n-1} + aX_n \qquad \text{Equation 1}$$

In Equation 1, $P_{n-1}$ denotes the L1-RSRP value output at a previous time, and the terminal may use the value of a as a preconfigured default value. The terminal has to output the value of $P_n$ in a time of $W_1$ [ms] after the output of the value of $P_{n-1}$. The terminal may use a fixed default value of $W_1$, i.e., $W_1 = W_{1,default}$.

According to the default settings, the terminal may output the L3-RSRP value of $F_n$ based on the L1-RSRP value of $P_n$ measured at the SS-block corresponding to the reference frequency location as follows. In the following description, $P_n$ denotes a value obtained by averaging, in the time domain, the L1-RSRP values measured based on multiple SS-block indices that are randomly selected by the terminal. The terminal may generate the L3-RSRP value of $F_n$ based on one currently output L1-RSRP value of $P_n$ output as follows $$F_n = (1-b)F_{n-1} + bP_n \qquad \text{Equation 2}$$

In Equation 2, $F_{n-1}$ denotes the L3-RSRP value output at the previous time, and the terminal may use a default value pre-set with b. The terminal has to output the value of $F_n$ in a time of $W_3$ [ms] after the output of the value of $F_{n-1}$.

After the initial access, the terminal may, at operation 330, transmit to the base station the capability information indicating whether it supports wideband operations. The capability information may include at least one of per-CC BW, number of CCs, and $M_{max}$.

The base station may configure to the terminal one or more bandwidth parts based on the wideband capability information received from the terminal. The base station may transmit to the terminal the information on the frequency locations corresponding to N SS-blocks being transmitted in the at least one configured bandwidth part through RRC signalling at operation S335. The frequency location information may include indices for distinguishing among N frequency domain SS-blocks and frequency domain locations corresponding to the respective indices. The frequency domain location information may be transmitted to the terminal in the form of center frequencies (F1, F2, ..., FN) of the SS-blocks as shown in Table 3.

TABLE 3

| Frequency domain index | Frequency domain location information |
|---|---|
| 1 | F1 [Hz] |
| 2 | F2 [Hz] |
| ... | ... |
| N | FN [Hz] |

The frequency domain location information may be transmitted to the terminal in the form of the center frequency F1 of the SS-block corresponding to the reference frequency location and offsets D2, D3, ..., DN of the remaining SS-blocks that respectively indicate distances from the center frequency F1 of the SS-block corresponding to the reference frequency location as shown in Table 4. That is, an offset Di is calculated by Di=Fi−F1 in Table 4. In this embodiment, Fi and Di are expressed in the unit of Hz as absolute values of the frequency locations or indicated by indices of the resource block (RB) as a unit of resources for use in the frequency domain.

TABLE 4

| Frequency domain index | Frequency domain location information |
|---|---|
| 1 (Reference) | F1 [Hz] |
| 2 | D2 [Hz] |
| ... | ... |
| N | DN [Hz] |

The base station may also transmit to the terminal the information on the time domain resources for SS-block transmission. According to an embodiment of the disclosure, the base station may transmit to the terminal the information on the time domain resources for transmitting SS-blocks that correspond to the reference frequency location and, in this case, the terminal may assume that the time domain resource information is identically applied to the N frequency domain SS-blocks. The base station may also transmit to the terminal the SS-block transmission-related time domain resource information per frequency location. The time domain resource information may include the value of T indicating the total number of SS-blocks defined in one SS-block burst set.

The terminal may ascertain the time and frequency location at which SS-block transmission is predicted based on the time domain resource information and frequency domain location information. If the terminal receives data scheduling information including the information on the time and frequency resource locations at which the SS-block transmission is predicted, it may perform rate matching for receiving data at the predicted locations.

The serving cell base station may select M frequency locations as measurement targets among N SS-blocks having the same SS-block index in the frequency domain and configure the selected frequency locations to the terminal through an RRC message at operation S340. Here, M may be equal to or less than N. The base station may transmit to the terminal the information indicating whether the terminal assumes the same QCL for the M SS-blocks with the same SS-block index in the form of Table 1 through an RRC message. The terminal may also perform measurement in the serving and neighboring cells under the assumption that the neighboring cells are transmitting the SS-blocks at the same M frequency locations.

The base station may transmit information indicating whether each of N frequency domain indices is ON or OFF so as to notify the terminal of the M-frequency locations as shown in Table 5. Here, the total number of frequency domain indices that are ON is M.

TABLE 5

| Frequency domain index | Measurement execution indicator |
|---|---|
| 1 (Reference) | ON |
| 2 | ON/OFF |
| ... | ... |
| N | ON/OFF |

According to another embodiment of the disclosure, the index corresponding to the reference frequency location is always configured with a measurement execution indicator set to ON. Accordingly, it may be possible to omit transmitting the measurement execution indication information for the index corresponding to the reference frequency location as shown in Table 6 and, even in this case, the terminal may be configured to always perform measurement for the index corresponding to the reference frequency location.

TABLE 6

| Frequency domain index | Measurement execution indicator |
|---|---|
| 2 | ON/OFF |
| ... | ... |
| N | ON/OFF |

According to another embodiment of the disclosure, the base station may transmit to the terminal the information on M frequency indices set to ON in the form as in Table 7.

TABLE 7

| Measurement execution target frequency domain index | m1, m2, m3, ..., mM |
|---|---|

According to another embodiment of the disclosure, assuming that the index m1 corresponding to the reference frequency location has to have the measurement execution indicator set to ON, it may be possible to transmit the information on the M-1 indices to the terminal with the exception of the index m1 corresponding to the reference frequency location as shown in Table 8.

TABLE 8

| Measurement execution tart frequency domain index | m2, m3, . . . , mM |
| --- | --- |

The base station may configure to the terminal a measurement mode for L1-RSRP at operation S345. The base station may configure to the terminal whether the terminal operates in mode A or mode B, using an RRC message, as show in Table 9.

TABLE 9

| Measurement mode for L1-RSRP | mode A/mode B |
| --- | --- |

The measurement mode may be configured implicitly according to the QCL assumption among the SS-blocks in the frequency domain. If the terminal assumes the same QCL among M frequency domain SS-blocks with the same SS-block index, it may be configured in mode A. If the terminal assumes different QCLs for the M frequency domain SS-blocks with the same SS-block index, it may be configured in mode B. Where to assume the same QCL or different QCLs for the M frequency domain SS-blocks with the same SS-block index may be configured by the base station as described above. In this case, operation S345 may be omitted or substituted by a step of transmitting information indicating whether to apply the same QCL assumption among the frequency domain SS-blocks with the same SS-block index.

The terminal performs RSRP measurement on individual SS-blocks corresponding to M frequency locations at operation S350. The terminal may measure RSRP values at the SS-blocks corresponding to the M frequency locations for the serving cell and the neighboring cells.

The terminal may output L1-RSRP value(s) in the configure measurement mode at operation S355.

In mode A, the terminal may output an L1-RSRP value per SS-block index. A description is made of the terminal operation for SS-block index t hereinafter. The operations to be described herein may be independently performed per SS-block index, and the terminal may generate the L1-RSRP value per SS-block index.

The terminal may average M RSRP values of $X_n(1)$, $X_n(2), \ldots, X_n(M)$ measured at the SS-blocks corresponding to M frequency locations. The terminal may output the L1-RSRP value $P_n$ using Equation 3.

$$P_n=(1-a)P_{n-1}+aX_n \qquad \text{Equation 3}$$

In Equation 3, $P_{n-1}$ denotes the L1-RSRP value output at a previous time, and the base station may make a configuration for the terminal to use a predetermined value a. The terminal has to output the value of $P_n$ in a time of $W_1$ [ms] after the output of the value of $P_{n-1}$. In order to determine the value of $W_1$ based on a fixed value of $W_{1,default}$, the terminal may use the methods of Equation 4. The base station may configure to the terminal which one of the following two methods for the terminal to use.

Method1: $W_1=W_{1,default}/M$

Method2: $W_1=W_{1,default}$ \qquad Equation 4

In mode B, the terminal may output ML1-RSRP values corresponding to the M frequency locations per SS-block index. A description is made of the terminal operation for SS-block index t hereinafter. The operations to be described herein may be independently performed per SS-block index, and the terminal may generate M L1-RSRP values per SS-block index.

The terminal may output ML1-RSRP values of $P_n(1)$, $P_n(2), \ldots, P_n(M)$ using M RSRP values of $X_n(1)$, $X_n(2), \ldots, X_n(M)$ measured at M frequency domain SS-blocks as shown in Equation 5.

$$P_n(i)=(1-a)P_{n-1}(i)+aX_n(i), \text{ where } i=1,2,\ldots,M \qquad \text{Equation 5}$$

In Equation 5, $P_{n-1}(i)$ denotes the L1-RSRP value measured at the SS-block corresponding to the $i^{th}$ frequency location and output at a previous time, and the base station may make a configuration for the terminal to use a predetermined value a. The terminal has to output the value of $P_n(i)$ in a time of $W_1$ [ms] after the output of the value of $P_{n-1}(i)$. The terminal may use $W_1=W_{1,\,default}$ by applying a fixed default value of $W_1$.

The terminal may perform a beam measurement report according to a configured mode at operation S360. It may be possible to determine whether to include frequency location information in the beam measurement report according to the configured mode, and the report may include only the L1-RSRP values measured in the serving cell.

If mode A is configured, the terminal may calculate one L1-RSRP measurement value per SS-block index. The terminal may report to the base station one SS-block index and an L1-RSRP value corresponding to the SS-block index on the basis of measured L1-RSRP values and, according to the configuration from the base station, the terminal may report to the base station one or more SS-block indices and L1-RSRP values corresponding to SS-block indices.

If mode B is configured, the terminal may calculate one L1-RSRP measurement value per SS-block index-frequency location combination. The terminal may transmit to the base station the information on the SS-block index-frequency location combinations generated based on the measured L1-RSRP values and the L1-RSRP values corresponding to the combinations. According to the configuration information received from the base station, the terminal may transmit the information on one or more combinations and L1-RSRP values corresponding to the respective combinations.

According to an embodiment of the disclosure, the terminal configured in mode A generates one L3-RSRP value $F_n$ using one frequency domain L1-RSRP value. The terminal configured in mode B generates one L3-RSRP value $F_n$ using M frequency domain L1-RSRP values. The L3-RSRP value may be a cell-specific value or a beam-specific value. The cell-specific L3-RSRP value may be used to generate one L3-RSRP value in one cell, and the beam-specific L3-RSRP value may be used to generate per-SS-block index L3-RSRP values in one cell. If the beam-specific L3-RSRP value is used, $P_n$ or $P_n(i)$ denotes L1-RSRP value corresponding to a certain SS-block index t in the following description. If the cell-specific L3-RSRP value is used, $P_n$ or $P_n(i)$ denotes a value obtained by averaging, in the time domain, the L1-RSRP values measured for a plurality of SS-block indices that are randomly selected by the terminal.

The terminal configured in mode A generates an L3-RSRP value $F_n$ using one L1-RSRP value $P_n$ that has been output, as shown in Equation 6.

$$F_n=(1-b)F_{n-1}+bP_n \qquad \text{Equation 6}$$

In Equation 6, $F_{n-1}$ denotes the L3-RSRP value output at a previous time, and the base station may make a configuration for the terminal to use a predetermined value of b. The terminal has to output the value of $F_n$ in a time of $W_3$ [ms]

after the output of the value of $F_{n-1}$. The base station may configure the value of $W_3$ to the terminal.

The terminal configured in mode B generates the L3-RSRP value Fusing M L1-RSRP values of $P_n(1)$, $P_n(2)$, ..., $P_n(M)$ that have been output, as shown in Equation 7.

$$F_n = (1-b)F_{n-1} + b(P_n(1) + P_n(2) + \ldots + P_n(M))/M \qquad \text{Equation 7}$$

In Equation 7, $F_{n-1}$ denotes the L3-RSRP value output at a previous time, and the base station may make a configuration for the terminal to use a predetermined value of b. The terminal has to output the value of $F_n$ in a time of $W_3$ [ms] after the output of the value of $F_{n-1}$. The base station may configure the value of $W_3$ to the terminal.

FIGS. 4 through 9 are flowcharts illustrating operations of a terminal configurable in mode A and mode B. The operations of FIGS. 4 through 9 may be performed after the operation of operation S330 of FIG. 3.

Figure 4:
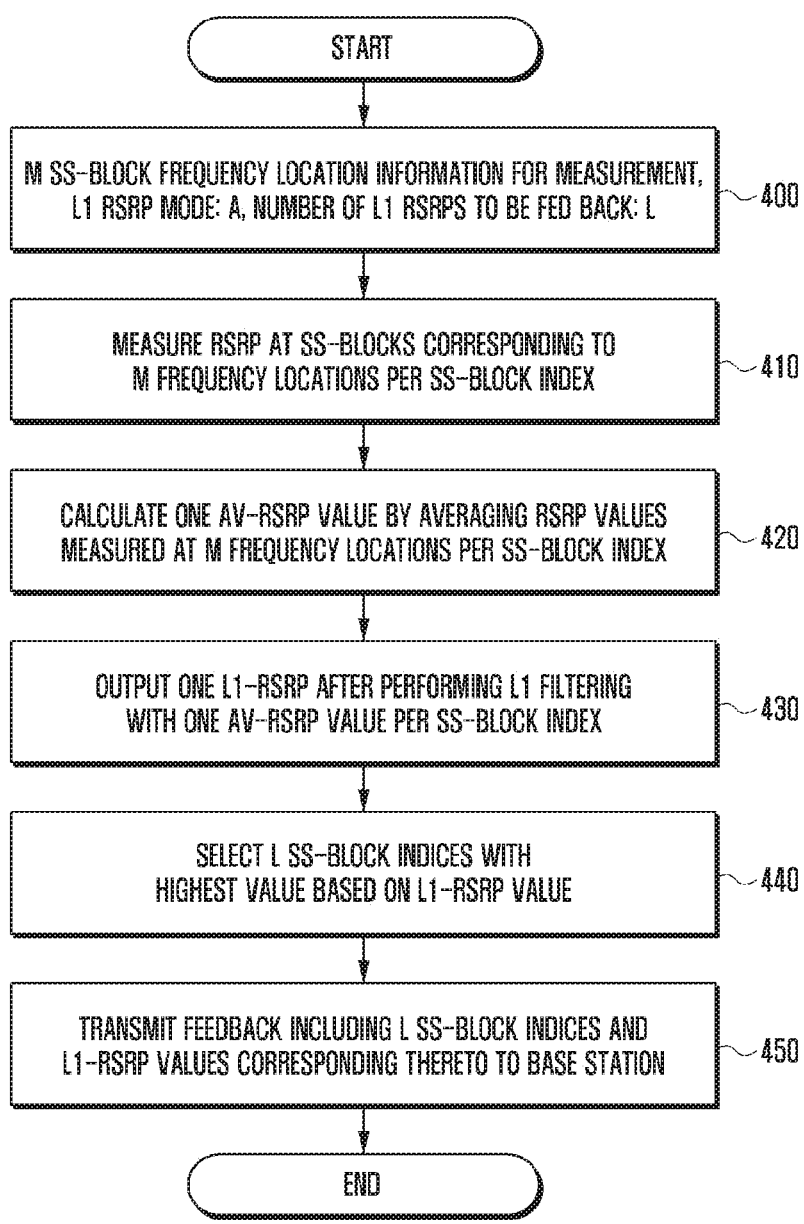
FIG. 4 is a flowchart illustrating operations of a terminal according to an embodiment of the disclosure.

FIG. 4 is a flowchart illustrating operations of a terminal according to an embodiment of the disclosure. In the embodiment of FIG. 4, the terminal is configured in mode A.

Referring to FIG. 4, the terminal receives configuration information indicating M SS-block frequency locations, L1-RSRP mode A, and number of L1-RSRP values L from a base station at operation 400. The base station transmits the configuration information to the terminal. In the case where the measurement mode is configured implicitly, the L1 RSRP mode A indication information may not be transmitted. The terminal measures RSRP values at the SS-blocks corresponding to the M frequency locations included in the configuration information per SS-block index at operation 410. Next, at operation 420, the terminal calculates an average RSRP (Av_RSRP) value by averaging the RSRP values measured at the M frequency locations per SS-block index. The terminal performs L1 filtering with the Av_RSRP value per SS-block index to output one L1-RSRP value at operation S430.

The terminal may output as many L1-RSRP values as the SS-block indices because the operations of operations 410, 420, and 430 are performed per index. At operation 440, the terminal selects L SS-block indices with the highest value based on the L1-RSRP values per SS-block index. At operation 450, the terminal may transmit to the base station feedback including the L selected SS-block indices and L1-RSRP values corresponding thereto. The feedback being transmitted to the base station may include L {SS-block index, L1-RSRP} values in the form as in Table 10.

TABLE 10

{SS-block index, L1-RSRP}_1, ..., {SS-block index, L1-RSRP}_L

Figure 5:
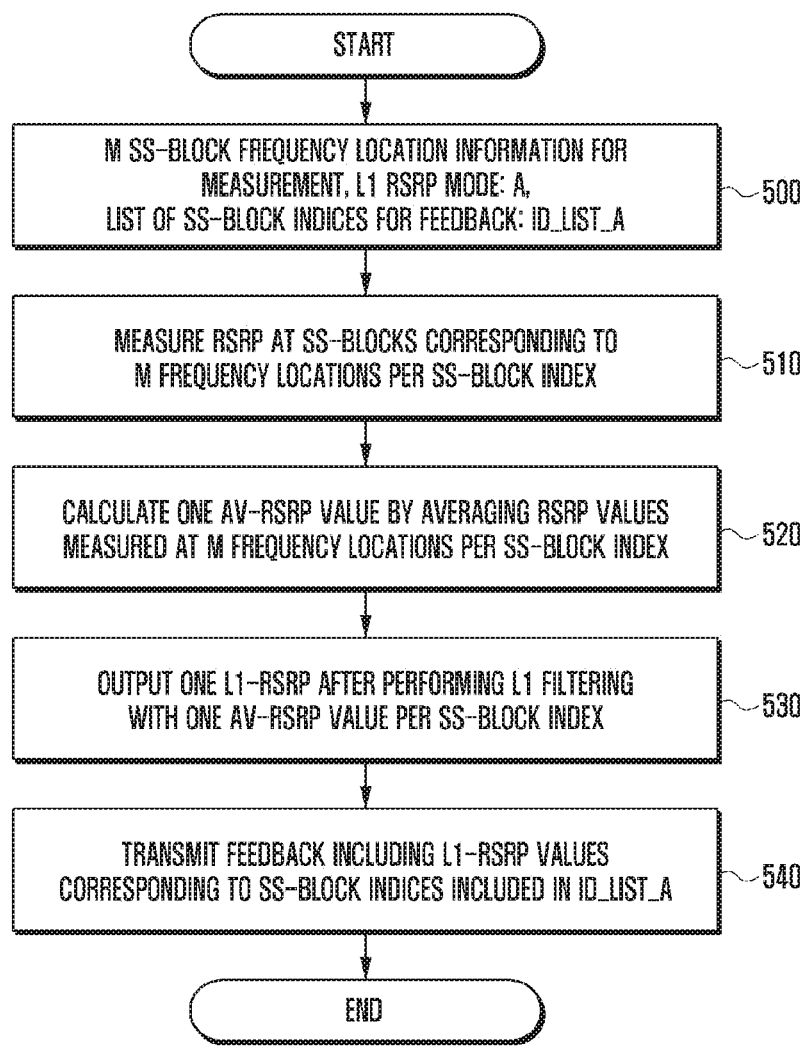
FIG. 5 is a flowchart illustrating operations of a terminal according to an embodiment of the disclosure.

FIG. 5 is a flowchart illustrating operations of a terminal according to an embodiment of the disclosure. Referring to FIG. 5, the terminal is configured in mode A.

The terminal receives configuration information indicating M SS-block frequency locations, L1-RSRP mode A, and a list of SS-block indices for feedback (Id_List_A) from a base station at operation 500. The Id_List_A includes one or more SS-block indices. The base station may transmit the Id_List_A to the terminal through a media access control (MAC) control element (CE) or an RRC message in the form as in Table 11.

TABLE 11

Id_List_A = {SS-block Index_1, ..., SS-block Index_L}

The operation of the terminal at operation 510 is identical to that at operation 410 of FIG. 4. The operation of the terminal at operation 520 is identical to that at operation 420 of FIG. 4. The operation of the terminal at operation 530 is identical to that at operation 430 of FIG. 4.

At operation 540, the terminal may transmit to the base station feedback including L1-RSRP values corresponding to L SS-block indices included in the Id_List_A. The feedback being transmitted to the base station may include only the L L1-RSRP values, which are arranged as shown in Table 12. The L L1-RSRP values may be arranged in the same order as the corresponding L SS-block indies arranged in the Id_List_A. That is, the $i^{th}$ L1_RSRP value in Table 12 is the RSRP value corresponding to the $i^{th}$ index in Table 11.

TABLE 12

{L1-RSRP}_1, {L1-RSRP}_2, ..., {L1-RSRP}_L

Figure 6:
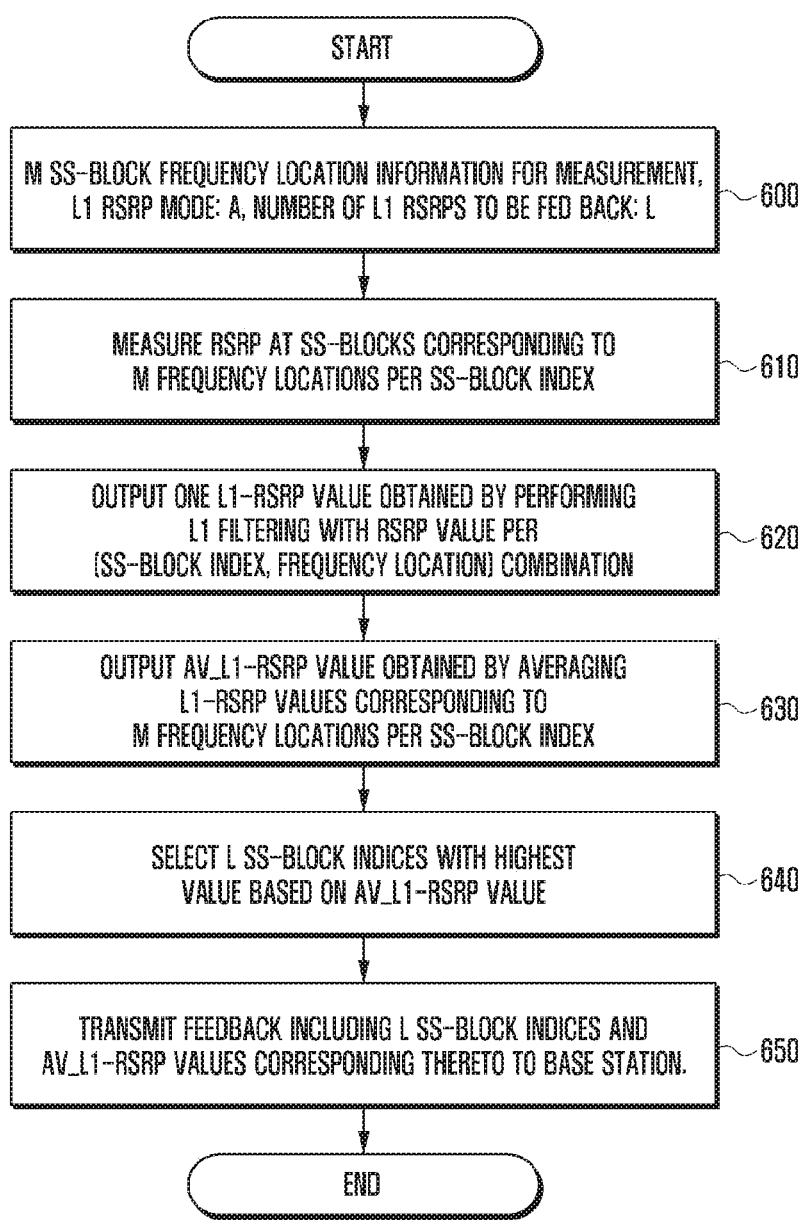
FIG. 6 is a flowchart illustrating operations of a terminal according to an embodiment of the disclosure.

FIG. 6 is a flowchart illustrating operations of a terminal according to an embodiment of the disclosure. Referring to FIG. 6, the terminal is configured in mode A.

The operation of the terminal at operation 600 is identical to that at operation 400 in FIG. 4. The operation of the terminal at operation 610 is identical to that at operation 410 in FIG. 4.

The terminal performs L1 filtering on every SS-block index-frequency location combination with the RSRP value measured at operation 610 and outputs the L1-RSRP value per SS-block index-frequency location combination at operation 620. At operation 630, the terminal outputs an average value Av_L1-RSRP obtained by averaging the L1-RSRP values corresponding to M frequency locations per SS-block index. At operation 640, the terminal selects L SS-block indices with the highest value based on Av_L1-RSRP values per SS-block index. At operation 650, the terminal may transmit to the base station feedback including Av_L1-RSRP values corresponding to L selected SS-block indices. The feedback being transmitted to the base station may include L {SS-block index, Av_L1-RSRP} values in the form as in Table 13.

TABLE 13

{SS-block index, Av_L1-RSRP}_1, ..., {SS-block index, Av_L1-RSRP}_L

Figure 7:
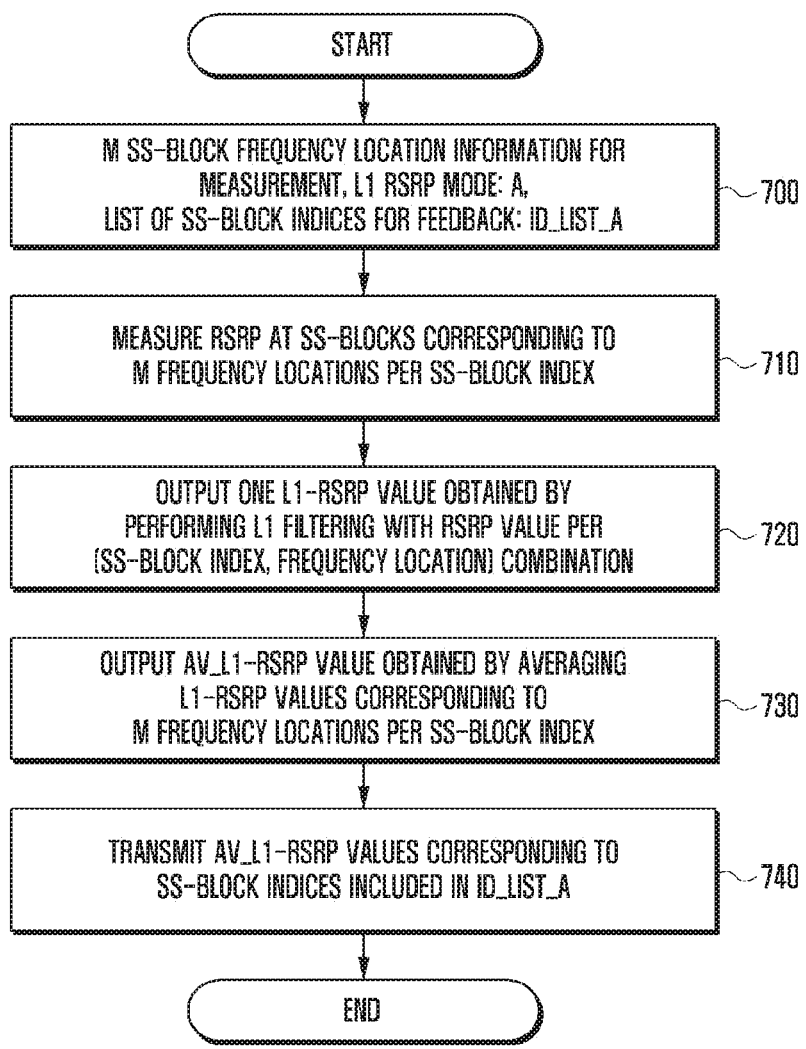
FIG. 7 is a flowchart illustrating operations of a terminal according to an embodiment of the disclosure.

FIG. 7 is a flowchart illustrating operations of a terminal according to an embodiment of the disclosure. Referring to FIG. 7, the terminal is configured in mode A.

The operation of the terminal at operation 700 is identical to that at operation 500 in FIG. 5. The operation of the terminal at operation 710 is identical to that at operation 610 in FIG. 6. The operation of the terminal at operation 720 is identical to that at operation 620 in FIG. 6. The operation of the terminal at operation 730 is identical to that at operation 630 in FIG. 6.

At operation 740, the terminal may transmit to the base station feedback including Av_L1-RSRP values corresponding to L SS-block indices included in the Id_List_A. The feedback being transmitted to the base station may include only the L Av_L1-RSRP values in the form as in Table 14. The L Av_L1-RSRP values may be arranged in the same order as the corresponding L SS-block indices arranged in the Id_List_A. That is, the $i^{th}$ Av_L1-RSRP value in Table 14 is the RSRP value corresponding to the $i^{th}$ index in Table 11.

TABLE 14

{Av_L1-RSRP}_1, ..., {Av_L1-RSRP}_L

Figure 8:
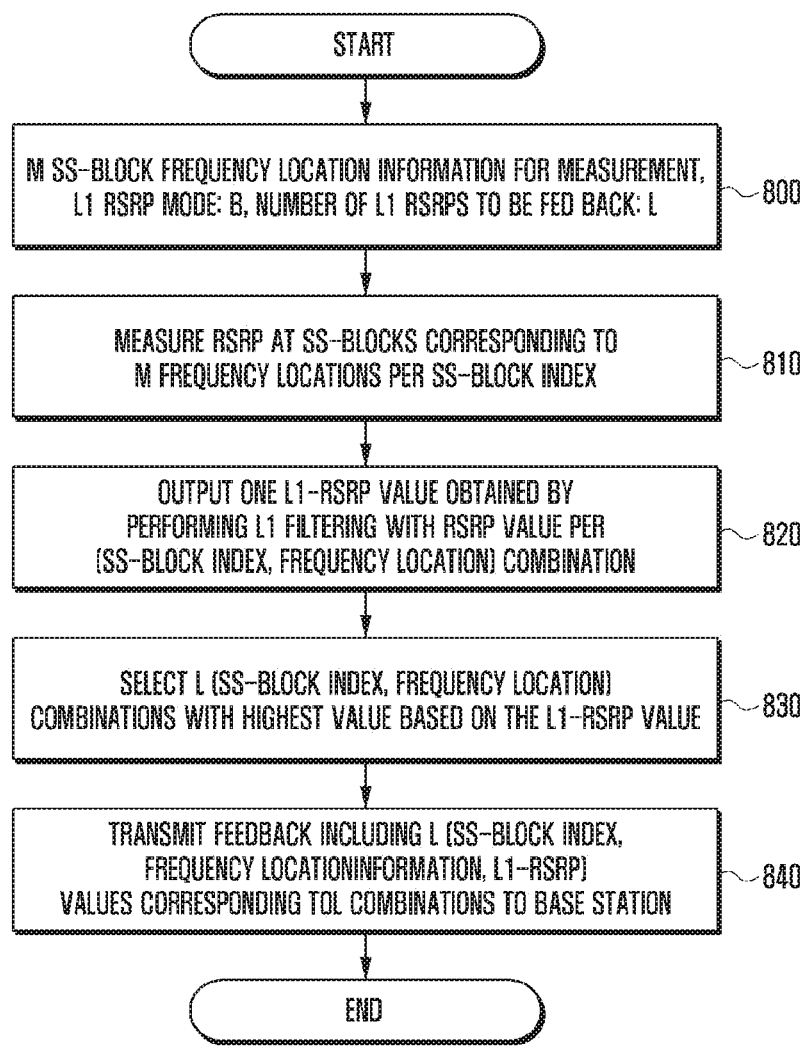
FIG. 8 is a flowchart illustrating operations of a terminal according to another embodiment of the disclosure.

FIG. 8 is a flowchart illustrating operations of a terminal according to an embodiment of the disclosure. Referring to FIG. 8, the terminal is configured in mode B.

The terminal receives configuration information indicating M SS-block frequency locations, L1-RSRP mode B, and number of L1-RSRP values L from a base station at operation 800. The base station transmits the configuration information to the terminal. In the case where the measurement mode is configured implicitly, the L1 RSRP mode B indication information may not be transmitted. The operation of the terminal at operation 810 is identical to that at operation 610 in FIG. 6. The operation of the terminal at operation 820 is identical to that at operation 620 in FIG. 6. The terminal may output T·M L1-RSRP values equal in number to the SS-block index-frequency location combinations because the operation of operation 820 is performed per SS-block index-frequency location combination.

At operation 830, the terminal selects L SS-block index-frequency location combinations with the highest value based on the L1-RSRP values. At operation 840, the terminal may transmit to the base station feedback including L {SS-block index, frequency location information, L1-RSRP} values corresponding to the L combinations in the form as in Table 15.

TABLE 15

Figure 9:
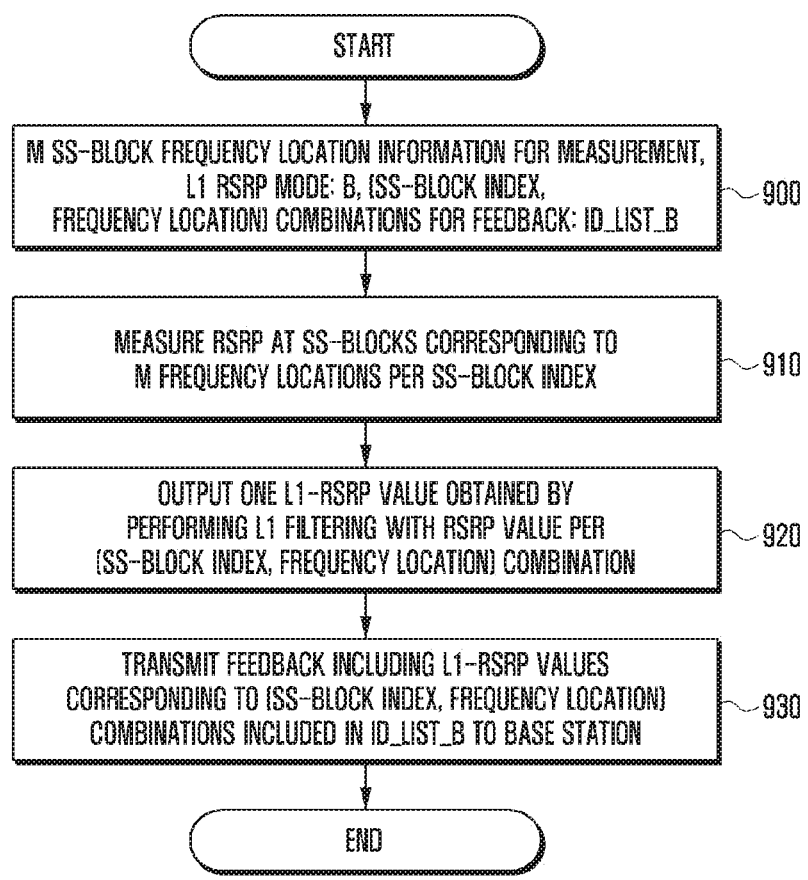
FIG. 9 is a flowchart illustrating operations of a terminal according to another embodiment of the disclosure.

{SS-block index, frequency location information, L1-RSRP}_1,
...,
{SS-block index, frequency location information, L1-RSRP}_L FIG. 9 is a flowchart illustrating operations of a terminal according to an embodiment of the disclosure. Referring to FIG. 9, the terminal is configured in mode B.

The terminal receives configuration information indicating M SS-block frequency locations, L1-RSRP mode B, and a list of SS-block index-frequency location combinations for feedback (Id_List_B) at operation 900. The base station transmits the configuration information to the terminal. In the case where the measurement mode is configured implicitly, the L1 RSRP mode B indication information may not be transmitted. The Id_List_B includes one or more SS-block index-frequency location combinations. The base station may transmit the Id_List_B to the terminal through a MAC CE or an RRC message in the form as in Table 16.

TABLE 16

Id_List_B = {SS-block index, frequency location information}_1, ..., {SS-block index, frequency location information}_L The operation of the terminal at operation 910 is identical to that at operation 810 in FIG. 8. The operation of the terminal at operation 920 is identical to that at operation 820 in FIG. 8.

At operation 930, the terminal may transmit to the base station feedback including L1-RSRP values corresponding to the L SS-block index-frequency location combinations included in the Id_List_B. The feedback being transmitted to the base station may include only the L L1-RSRP values, which are arranged, as shown in Table 12, in the same order as the corresponding L SS-block index-frequency location combinations arranged in the Id_List_B. That is, the $i^{th}$ L1_RSRP value in Table 17 is the RSRP value corresponding to the $i^{th}$ SS-block index-frequency location combination in Table 16.

TABLE 17

{L1-RSRP}_1, ..., {L1-RSRP}_L

Hereinafter, a description is made of the SS-block and CORESET monitoring method.

In the following description, the term "control resource set (CORESET)" denotes a time and/or frequency resource region for a terminal to perform blind decoding to detect a physical downlink control channel (PDCCH). In the following description, if the terminal monitors a CORESET, this means that the terminal performs blind decoding in a time and/or frequency resource region configured by the base station to detect a PDCCH.

It may be possible to configure time and/or frequency resource regions corresponding to one or more CORESETs to the terminal, which may be configured to monitor one or more CORESETs. If the terminal is configured to monitor one or more CORESETs, the base station may send the terminal the information indicating a CORESET in association with the SS-blocks that is to be described hereinafter.

The base station may configure per terminal whether CORESET monitoring is necessary at OFDM symbols carrying SS-blocks. The base station may make a configuration for the terminal to perform monitoring on the configured CORESET regardless of whether the OFDM symbols constituting the CORESET configured to the terminal are frequency-division-multiplexed (FDMed) with the SS-blocks. The base station may make a configuration for the terminal to not perform monitoring of the configured CORESET on all OFDM symbols carrying SS-blocks belonging to a certain SS-block burst. The base station may also make a configuration for the terminal to not perform monitoring of the configured CORESET for all OFDM symbols carrying the SS-blocks belonging a predetermined SS-block burst set.

The terminal may transmit to the base station the information indicating whether it can simultaneously perform monitoring on both the CORESETs and SS-blocks configured to the terminal. In this case, the base station may not make the above configuration.

Figure 10:
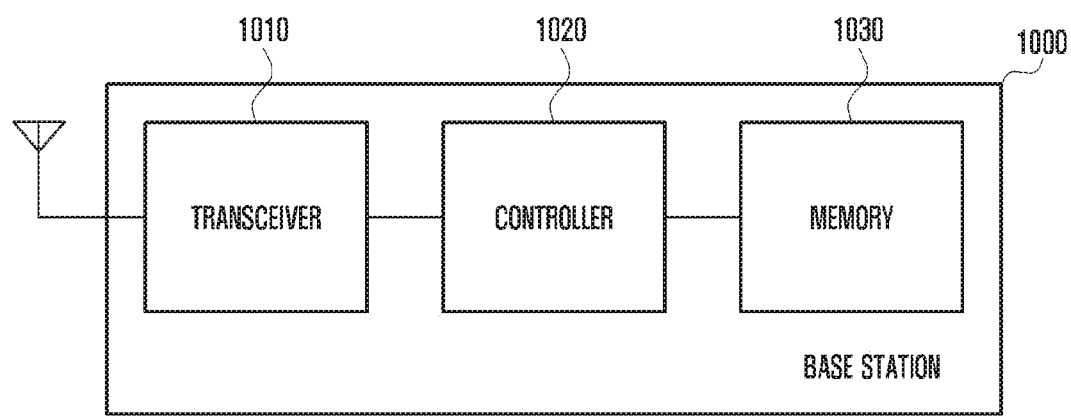
FIG. 10 is a block diagram illustrating a configuration of a base station according to an embodiment of the disclosure.

FIG. 10 is a block diagram illustrating a configuration of a base station according to an embodiment of the disclosure.

Referring to FIG. 10, the base station 1000 may include a transceiver 1010 (e.g., a communication unit), a controller 1020 (e.g., at least one processor), and a storage unit 1030 (e.g., a memory). In the disclosure, the controller 1020 may be defined as a circuit, an application-specific integrated circuit, or at least one processor.

The transceiver 1010 may transmit and receive signals to and from a terminal and another network entity. For example, the transceiver 1010 may transmit system information, a synchronization signal, and a reference signal to the terminal.

The controller 1020 may control overall operations of the base station according to an embodiment of the disclosure. For example, the controller 1020 may control signal flows among other components to perform the operations as described with reference to the flowcharts. In detail, the controller 1020 may control the transceiver 1010 to transmit measurement configuration information to the terminal and receive a result of measurement performed based on the measurement configuration information from the terminal.

The storage unit 1030 may store at least one of the information transmitted and received by the transceiver 1010 and the information generated by the controller 1020. For example, the storage unit 1030 may store the measurement result transmitted by the terminal.

Figure 11:
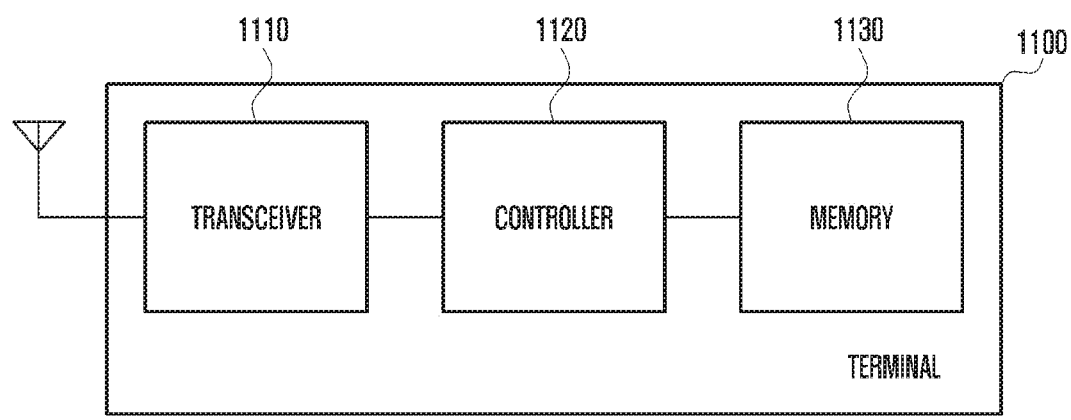
FIG. 11 is a block diagram illustrating a configuration of a terminal according to an embodiment of the disclosure.

FIG. 11 is a block diagram illustrating a configuration of a terminal according to an embodiment of the disclosure.

Referring to FIG. 11, the terminal 1100 may include a transceiver 1110 (e.g., a communication unit), a controller 1120 (e.g., at least one processor), and a storage unit 1130 (e.g., a memory). In the disclosure, the controller may be defined as a circuit, an application-specific integrated circuit, or at least one processor.

The transceiver 1110 may transmit and receive signals to and from a base station. For example, the transceiver 1110 may receive system information, a synchronization signal, and a reference signal from the base station.

The controller 1120 may control overall operations of the terminal according to an embodiment of the disclosure. For example, the controller 1120 may control signal flows among other components to perform the operations as described with reference to the flowcharts. In detail, the controller 1120 may control the transceiver 1110 to receive measurement configuration information from the base station, generate L1-RSRP and L3-RSRP as a result of measurement performed based on the measurement configuration information, and control the transceiver 1110 to transmit the measurement result to the base station.

The storage unit 1130 may store at least one of the information transmitted and received by the transceiver 1110 and the information generated by the controller 1120. For example, the storage unit 1130 may store the L1-RSRP and/or L3-RSRP.

As described above, the disclosure is advantageous in terms of improving L1/L3-RSRP measurement accuracy and speed by allowing a terminal to receive multiple SS-blocks in the frequency domain.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a base station of a communication system, the method comprising:
    transmitting measurement configuration information to a terminal, the measurement configuration information including information on a set of at least one of index of synchronization signal block (SS block) to be measured and information on a plurality of frequency locations of SS blocks to be measured; and
    receiving measurement result information including at least one pair of an SS block index included in the set and reference signal received power (RSRP) information associated with the SS block index from the terminal.

2. The method of claim 1, wherein, in a case that a first measurement mode is configured to the terminal, the RSRP information associated with the SS block index comprises a value obtained by averaging measurement results of a plurality of SS blocks, transmitted at a same time, corresponding to the SS block index.

3. The method of claim 1, wherein, in a case that a second measurement mode is configured to the terminal, the RSRP information associated with the SS block index comprises RSRP information of SS blocks, distinguished by frequency resources, corresponding to the SS block index.

4. The method of claim 1, wherein the measurement configuration information further includes information indicating a first measurement mode or a second measurement mode and information indicating whether a quasi-colocation (QCL) assumption is applied to a plurality of SS blocks, transmitted at a same time, corresponding to the SS block index.

5. A method of a terminal of a communication system, the method comprising:
    receiving measurement configuration information from a base station, the measurement configuration information including information on a set of at least one of index of synchronization signal block (SS block) to be measured and information on a plurality of frequency locations of SS blocks to be measured;
    measuring at least one SS block indicated by the at least one of index of SS block; and
    transmitting measurement result information including at least one pair of an SS block index included in the set and reference signal received power (RSRP) information associated with the SS block index to the base station.

6. The method of claim 5, wherein, in a case that a first measurement mode is configured to the terminal, the RSRP information associated with the SS block index comprises a value obtained by averaging measurement results of a plurality of SS blocks, received at a same time, corresponding to the SS block index.

7. The method of claim 5, wherein, in a case that a second measurement mode is configured to the terminal, the RSRP information associated with the SS block index comprises RSRP information of SS blocks, distinguished by frequency resources, corresponding to the SS block index.

8. The method of claim 5, wherein the measurement configuration information further includes information indicating a first measurement mode or a second measurement mode and information indicating whether a quasi-colocation (QCL) assumption is applied to a plurality of SS blocks, transmitted at a same time, corresponding to the SS block index.

9. A base station of a communication system, the base station comprising:
    a transceiver; and
    at least one processor coupled with the transceiver and configured to:
        transmit measurement configuration information to a terminal, the measurement configuration information including information on a set of at least one of index of synchronization signal block (SS block) to be measured and information on a plurality of frequency locations of SS blocks to be measured, and
        receive measurement result information including at least one pair of an SS block index included in the set and reference signal received power (RSRP) information associated with the SS block index from the terminal.

10. The base station of claim 9, wherein, in a case that a first measurement mode is configured to the terminal, the RSRP information associated with the SS block index comprises a value obtained by averaging measurement results of a plurality of SS blocks, transmitted at a same time, corresponding to the SS block index.

11. The base station of claim 9, wherein, in a case that a second measurement mode is configured to the terminal, the RSRP information associated with the SS block index comprises RSRP information of SS blocks, distinguished by frequency resources, corresponding to the SS block index.

12. The base station of claim 9, wherein the measurement configuration information further includes information indicating a first measurement mode or a second measurement mode and information indicating whether a quasi-colocation (QCL) assumption is applied to a plurality of SS blocks, transmitted at a same time, corresponding to the SS block index.

13. A terminal of a communication system, the terminal comprising:
    a transceiver; and
    at least one processor coupled with the transceiver and configured to:
        receive measurement configuration information from a base station, the measurement configuration information including information on a set of at least one index of synchronization signal block (SS block) to be measured and information on a plurality of frequency locations of SS blocks to be measured,
        measure at least one SS block indicated by the at least one of index of SS block, and
        transmit measurement result information including at least one pair of an SS block index included in the set and reference signal received power (RSRP) information associated with the SS block index to the base station.

14. The terminal of claim 13, wherein, in a case that a first measurement mode is configured to the terminal, the RSRP information associated with the SS block index comprises a value obtained by averaging measurement results of a plurality of SS blocks, received at a same time, corresponding to the SS block index.

15. The terminal of claim 13, wherein, in a case that a second measurement mode is configured to the terminal, the RSRP information associated with the SS block index comprises RSRP information of SS blocks, distinguished by frequency resources, corresponding to the SS block index.

16. The terminal of claim 13, wherein the measurement configuration information further includes information indicating a first measurement mode or a second measurement mode and information indicating whether a quasi-colocation (QCL) assumption is applied to a plurality of SS blocks, transmitted at a same time, corresponding to the SS block index.

* * * * *